United States Patent
Popoveniuc et al.

(10) Patent No.: US 10,454,690 B1
(45) Date of Patent: Oct. 22, 2019

(54) DIGITAL CERTIFICATES WITH DISTRIBUTED USAGE INFORMATION

(71) Applicant: Amazon Technologies, Inc., Seattle, WA (US)

(72) Inventors: Stefan Popoveniuc, Bethesda, MD (US); David Ripton, Ashburn, VA (US); Alexandr Ukrainchik, Herndon, VA (US); Yuk-Chung Eric Kam, Bethesda, MD (US); Mikhail Denisenko, North Potomac, MD (US); Robert Eric Fitzgerald, Aldie, VA (US); Matthew Allen Estes, Aldie, VA (US); Tyler Eckstein, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

(21) Appl. No.: 15/669,845

(22) Filed: Aug. 4, 2017

(51) Int. Cl.
*H04L 29/06* (2006.01)
*H04L 9/32* (2006.01)
*H04L 9/14* (2006.01)
*H04L 9/30* (2006.01)

(52) U.S. Cl.
CPC .......... *H04L 9/3268* (2013.01); *H04L 9/14* (2013.01); *H04L 9/30* (2013.01); *H04L 9/3247* (2013.01)

(58) Field of Classification Search
CPC ... H04L 9/3268; H04L 9/3263; H04L 9/3247; H04L 9/30
See application file for complete search history.

(56) References Cited

U.S. PATENT DOCUMENTS

| | | | | |
|---|---|---|---|---|
| 6,615,347 | B1* | 9/2003 | de Silva | H04L 9/3263 713/156 |
| 7,073,073 | B1* | 7/2006 | Nonaka | G06F 21/10 380/277 |
| 2002/0184182 | A1* | 12/2002 | Kwan | G06Q 20/0855 |
| 2005/0065799 | A1* | 3/2005 | Dare | G06F 21/6245 705/50 |
| 2007/0130439 | A1* | 6/2007 | Andersson | G06F 21/575 711/200 |
| 2008/0082818 | A1* | 4/2008 | Kim | H04L 63/06 713/156 |
| 2009/0282242 | A1* | 11/2009 | Lortz | H04L 63/0428 713/157 |
| 2010/0250948 | A1* | 9/2010 | Little | H04L 63/0272 713/175 |

(Continued)

OTHER PUBLICATIONS

Mary R. Thompson et al., Certificate-Based Authorization Policy in a PKI Environment, Nov. 2003, ACM, vol. 6 Issue 4, pp. 566-588.*

(Continued)

*Primary Examiner* — Luu T Pham
*Assistant Examiner* — Fahimeh Mohammadi
(74) *Attorney, Agent, or Firm* — Davis Wright Tremaine LLP

(57) ABSTRACT

Digital certificates include pointers to remote certificate information stores that maintain usage information associated with digital certificates. The pointers provide a mechanism for enabling the remote certificate information stores to be queried for usage information associated with a particular digital certificate. The usage information can be used to determine a validity of the digital certificate.

20 Claims, 7 Drawing Sheets

(56) References Cited

U.S. PATENT DOCUMENTS

| | | | | |
|---|---|---|---|---|
| 2013/0013919 | A1* | 1/2013 | Adams | H04L 63/0823 |
| | | | | 713/156 |
| 2013/0254535 | A1* | 9/2013 | Akehurst | H04L 29/06 |
| | | | | 713/158 |
| 2014/0331086 | A1* | 11/2014 | Resch | G06F 11/1458 |
| | | | | 714/15 |
| 2015/0156194 | A1* | 6/2015 | Modi | H04L 9/3268 |
| | | | | 713/158 |
| 2017/0041150 | A1* | 2/2017 | Ishiguro | G06F 21/33 |
| 2017/0279784 | A1* | 9/2017 | Kent | H04L 9/007 |
| 2018/0262347 | A1* | 9/2018 | Levy | H04L 9/3268 |
| 2019/0140837 | A1* | 5/2019 | Cheng | H04W 8/20 |

OTHER PUBLICATIONS

Pino Persiano et al., A Secure and Private System for Subscription-Based Remote Services, Nov. 2003, ACM, vol. 6 Issue 4, pp. 472-500.*

Marianne A. Azer et al., Certification and Revocation Schemes in Ad Hoc Networks Survey and Challenges, Sep. 10, 2007, IEEE, pp. 1-6.*

Dumitru Daniel Dinu et al., DHCP Server Authentication using Digital Certificates, Jul. 28, 2014, IEEE, pp. 1-6.*

"All Types of Digital Certificates Are Also a X509 Certificate," National Positions, Aug. 2, 2013, <http://www.digi-sign.com/node/10922> [retrieved Aug. 8, 2017], 1 page.

Polk, W., et al., "Algorithms and Identifiers for the Internet X.509 Public Key Infrastructure Certificate and Certificate Revocation List (CRL) Profile," Request for Comments: 3279, Standards Track, Apr. 2002, 26 pages.

Schaad, J., et al., "Additional Algorithms and Identifiers for RSA Cryptography for Use in the Internet X.509 Public Key Infrastructure Certificate and Certificate Revocation List (CRL) Profile," Request for Comments: 4055, Standards Track, Jun. 2005, 24 pages.

Leontiev, S., and D. Shefanovski, "Using the GOST R 34.10-94, GOST R 34.10-2001, and GOST R 34.11-94 Algorithms With the Internet X.509 Public Key Infrastructure Certificate and CRL Profile," Request for Comments: 4491, Standards Track, 19 pages.

Zeilenga, K., "Lightweight Directory Access Protocol (LDAP) Schema Definitions for X.509 Certificates," Request for Comments: 4523 Standards Track, Jun. 2006, 25 pages.

Cooper, D., et al., "Internet X.509 Public Key Infrastructure Certificate and Certificate Revocation List (CRL) Profile," Request for Comments: 5280, Standards Track, 141 pages.

Eastlake, D., "Transport Layer Security (TLS) Extensions: Extension Definitions," Request for Comments: 6066, Standards Track, Jan. 2011, 25 pages.

Pettersen, Y., "The Transport Layer Security (TLS) Multiple Certificate Status Request Extension," Request for Comments: 6961, Standards Track, Jun. 2013, 11 pages.

* cited by examiner

DIGITAL CERTIFICATES WITH DISTRIBUTED USAGE INFORMATION

BACKGROUND

Digital certificates are an important part of network security. Digital certificates provide two main functions. First, digital certificates provide a way for an entity to prove ownership of a public key. Second, digital certificates provide a way for a network entity such as a client, service, or network application, to prove the entity's identity. Certificate Authorities ("CAs") play an important role by validating the identity of entities that request digital certificates, and by issuing digital certificates to entities that the Certificate Authority ("CA") has validated. When a certificate authority issues a digital certificate, the certificate authority signs the digital certificate using a private key belonging to the certificate authority. A network client can verify the identity of a network service by requesting the digital certificate belonging to the network service. If the digital certificate provided by the network service is signed by the certificate authority, and the network client is configured to trust the certificate authority, the network client can verify the signatures on the digital certificate to confirm the identity of the network service.

In addition, the digital certificate may include validity range and various extended use fields that modify or otherwise restrict the usage of the digital certificate. For CAs and network services managing and updating this information is difficult. For example, when a digital certificate expires (e.g., is currently outside of the validity range assigned to the digital certificate), an administrator or other entity of the network service must obtain a new digital certificate from a CA, remove the expired certificate from a plurality of computer systems providing the network service, and install the new digital certificate on the plurality of computer systems providing the network service. In addition, the CAs must maintain a Certificate Revocation List (CRL), which is a list of digital certificates that have been revoked by an entity (e.g., the issuing CA) before the digital certificates scheduled expiration date and should no longer be trusted. In many situations the CRL is large and difficult for both the CA and network services to manage. Furthermore, revoked digital certificates must remain on the CRL until after the expiration of the validity range to ensure that the digital certificates are not trusted.

BRIEF DESCRIPTION OF THE DRAWINGS

Various techniques will be described with reference to the drawings, in which.

DETAILED DESCRIPTION

Figure 1:
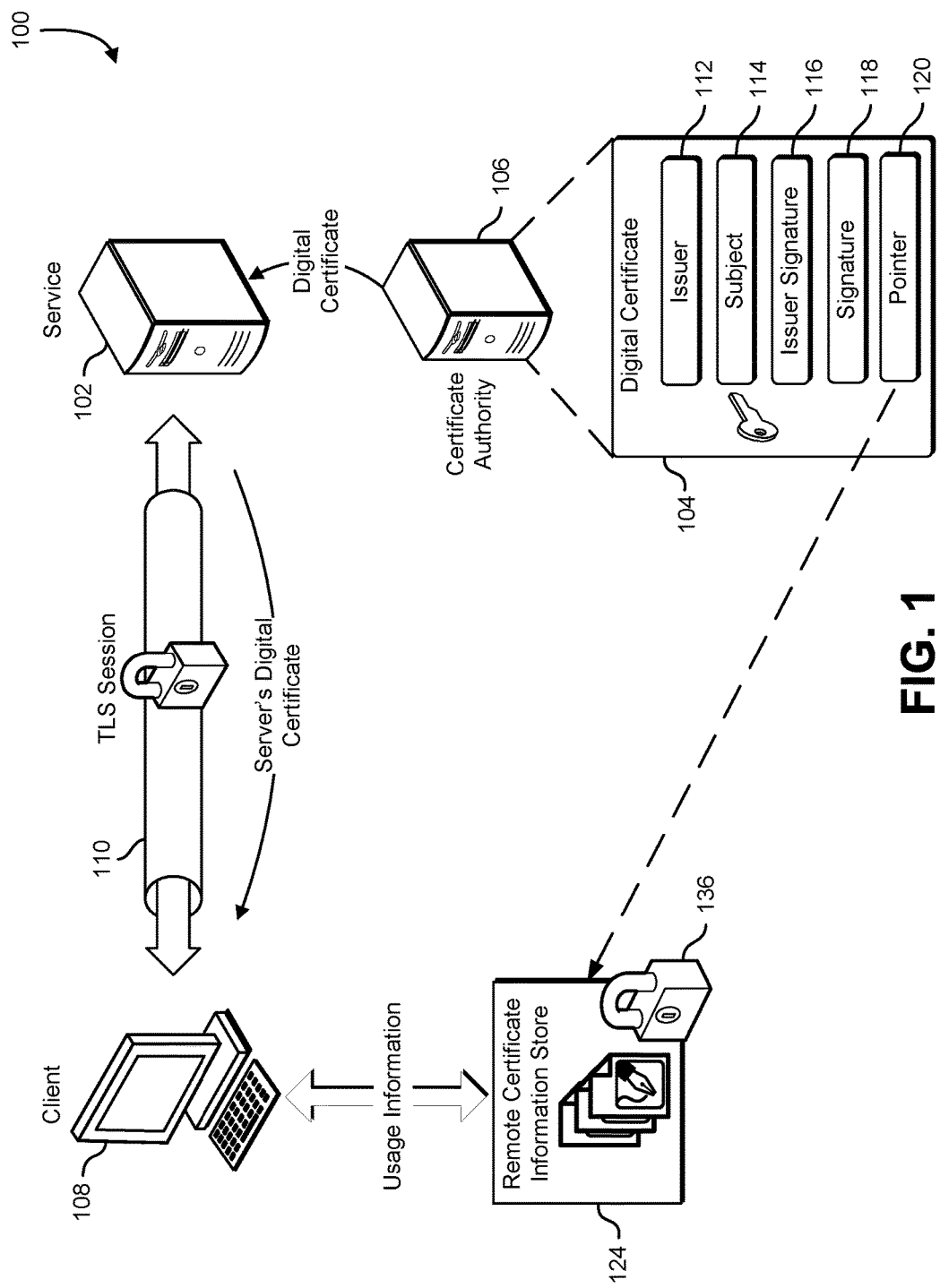
FIG. 1 illustrates an example environment in which a digital certificate includes a pointer to a remote certificate information store containing information associated with the usage of the digital certificate in accordance with an embodiment.

In various examples described in greater detail below, a client application running on a computer system initiates a secure network connection to a network service. In response to receiving the connection request, the network service provides a digital certificate to the client application so that the client application is able to verify the identity of the network service. The digital certificate includes a number of attributes that describe properties of the digital certificate (e.g., validity range, usage restrictions, extensions, and various other attributes described in greater detail below) and properties of the owner of the digital certificate. The digital certificate is verified using a chain of trust that is verifiable via a number of digital signatures. The certificate is digitally signed by the owner of the certificate, by a sequence of intermediate certificate authorities, and finally by a root certificate authority. The application verifies the information contained in the digital certificate by verifying the signatures in the chain of trust and by verifying that the certificate is still valid (e.g., has not been revoked).

In some implementations, the a portion of the attributes include a pointer or other reference value to direct the client application to a location containing information associated with a particular attribute. For example, the point includes a Uniform Resource Locator (URL), a Uniform Resource Identifier (URI), a Uniform Resource Name (URN), an Internet Protocol (IP) address, or other information suitable for directing the client application to a location of the attribute and/or information associated with the attribute. The location may be a web server or other computing resource accessible over a network that maintains the attribute information, such as a remote certificate information store as described in greater detail below. In one example, the validity range of an X.509 digital certificate includes an URL pointer to a remote certificate information store that contains a value representing the validity range of the X.509 digital certificate. This value may be cryptographically signed by the CA that issued the X.509 digital certificate, for example using the CAs private key, to provide assurances of the validity and authenticity of the value.

In this manner, information and attributes of a digital certificate may be modified without requiring copies of the digital certificate to be modified and reissued. For example, if the network service and/or the CA want to modify the validity range of a particular digital certificate, the validity range can be modified by changing the value of the validity range of the particular digital certificate maintained in the remote certificate information store. This process may be used to modify any attribute used to control and/or constrain the use and/or validity of a digital certificate. For example, a particular digital certificate includes an extended use field including a pointer to a remote certificate information store maintaining a value indicating a number of times the digital certificate can be used. In such examples, this value can be modified at a central location (e.g., the remote certificate information store) without having to modify the digital certificate directly which may be installed on a plurality of distinct distributed computing resources of the network service.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment in which various embodiments may be practiced. An environment 100 includes a service 102 that owns a digital certificate 104 issued by a certificate authority 106. The service 102 may be hosted by a server computer system, group of server computer systems, or other computing resources individually or in combination. Furthermore, in some embodiments, at least a portion of the computing resources used to implement the service 102 are provided by a computing resource service provider. In various embodiment, a client computer system 108 requests a secure connection to the service 102 via a TLS session 110 or other cryptographically secure communications sessions such as secure sockets layer (SSL), hypertext transfer protocol secure (HTTPS), or Secure Shell (SSH).

In some embodiments, the TLS session 110 may be replaced with a Virtual Private Network ("VPN") connection, Internet Protocol Security ("IPSec") connection, Secure Sockets Layer ("SSS") connection, or other secure network connection. In response to the request for a secure network connection and/or session, the service 102 provides the client computer system 108 with the digital certificate 104. In various embodiments, the digital certificate 104 is an X.509 digital certificate that includes information contained in various fields such as an issuer field 112, a subject field 114, an issuer signature 116, and a subject signature 118. Various fields the digital certificate 104 include a pointer 120 (e.g., URL or URI) pointing to a remote certificate information store 124 that contains information describing the validity time period, signature algorithms used, serial number, usage restrictions and/or requirements, chain of trust associated, or other information with the digital certificate 104.

A pointer 120 may be information that facilitates obtaining usage information associated with a digital certificate 104. In some examples, the pointer 120 is an identifier of a network location, such as an IP address, a URL, or other URI. Furthermore, the pointer may be another identifier of a system, such as an identifier that is usable by a service to lookup a network location, a particular computer system of a set of computer systems implementing the service, a storage location. Such an identifier may comply with a standard or may be specific to the service, etc. As described in greater detail below, the digital certificate may include a plurality of pointers 120 of the same or different types. In one example, the digital certificate 104 includes a first pointer comprising a URL to a web server hosting a database containing validity range information associated with the digital certificate 104 and a second pointer comprising an identifier of a storage service and storage location maintained by the storage service containing information indicating a number of times the digital certificate may be used. As described in the present disclosure, a digital certificate may include any data object and/or information that can be used to verify the identity of an entity transmitting information to a destination, for example, the client computer system 108.

The client computer system 108 examines the provided digital certificate 104 and attempts to determine whether the provided digital certificate 104 is valid and verifies the identity of the service 102 or computing resource(s) implementing the service 102. In one example, the client computer system 108 validates the digital signatures of the digital certificate 104 by at least decrypting the digital signatures using the service's 102 public key. If at least one digital signature included in the digital certificate 104 is not valid, the client computer system 108 may determine that the digital certificate 104 is invalid, and terminate the TLS session 110. If the digital signatures on the digital certificate 104 are valid, the client computer system 108, in an embodiment, queries the remote certificate information store 124 to determine additional information indicating the validity of the digital certificate 104. In various embodiments, the client computer system 108 may query the remote certificate information store 124 and validate one or more digital signatures of the digital certificate 104 in parallel. An application, executed by the client computer system 108, in various embodiments, is responsible for generating and transmitting the query to the remote certificate information store 124.

In various embodiments, the remote certificate information store 124 maintains information associated with the digital certificate 104 in accordance with the X.509 digital certificate schema and the information is digitally signed 136 by the certificate authority 106. The remote certificate information store 124 may include a database keyed based at least in part on information contained in the issuer field 112, digital certificate 104 serial number, or any other information capable of identifying the digital certificate 104. In this manner, the client computer system 108 can query the remote certificate information store 124 using, for example, the issuer field 112 and the digital certificate 104 serial number. In response, the remote certificate information store 124 locates usage information associated with the digital certificate based at least in part on the issuer field 112 and the digital certificate 104 serial number.

In an embodiment, the remote certificate information store 124 is a service provided by a computing resource service provider or other entity such as the certificate authority 106. In such embodiments, the remote certificate information store 124 may include various components of a service such as a service frontend, request routing fleeting, server computer systems, backend server (e.g., data storage servers), or other computing resources used to implement a service. As described in greater detail below in connection with FIGS. 2 and 3 there may be multiple instances of the remote certificate information store 124. In such embodiments where the remote certificate information store 124 is implemented as a remote certificate information store service, there may be a single or multiple interfaces for the client computer system 108 to communicate with the remote certificate information store service and a component of the remote certificate information store service, such as a request routing component, directs request from the client computer systems 108 to a particular remote certificate information store capable of fulfilling the request.

For example, the client computer system 108 is attempting to determine the validity range for the digital certificate 104 to determine whether to terminate or continue the TLS session 110. The client computer system 108 generates a query for validity range information associated with the digital certificate 104, the query including the issuer field 112 and the digital certificate 104 serial number as described above. The client computer system 108 then determines a location to transmit the query based at least in part on the pointer 120. For example, the pointer may include a URL to a server computer hosting the information or a record maintained by a Domain Name Server (DNS) containing the information. In addition, the DNS server may be used to determine a location of the remote certificate information store 124 based at least in part on the pointer 120. Any mechanism that may be used to direct the client computer system 108 to the location of information associated with the digital certificate is considered within the scope of the present disclosure. Returning to the example above, the client then transmits the query to the remote certificate information store 124 based at least in part on the location indicated in the pointer 120. The remote certificate information store 124 may then return the validity range information to the client computer system 108 and the client computer system 108 may then make the determination whether to terminate the TLS session 112 based at least in part on the return validity information.

In various embodiments described in greater detail below, the certificate authority 106 maintains and updates the information stored in the remote certificate information store 124. In addition, this information may be updated by the certificate authority 106 with or without a contemporaneous or near contemporaneous request from the service 102 or an entity associated with the service 102. In one example, the certificate authority 106 determines that the validity range for the digital certificate will expire within the next 24 hours, the certificate authority 106 then updates the validity range stored in the remote certificate information store 124 without a corresponding request from the service 102. In this manner, the certificate authority 106 can provide easy renewal and/or maintenance of the digital certificate 104 without requiring additional action by the service 102. In various embodiments, this avoids requiring new digital certificates to be installed on the computing resources implementing the service 102 if the digital certificate 104 has not been compromised or is otherwise still valid but for a usage restriction such as the validity range or a number of times the digital certificate 104 can be used.

In various embodiments, the certificate authority 106 may receive a service call (e.g., web service call or API call) to generate the digital certificate 104 on behalf of the service 102. The certificate authority 106 may then determine one or more parameters for the digital certificate 104, such as any of the attributes and/or fields described in greater detail below in connection with FIG. 4. In addition to determining the one or more parameters for the digital certificate 104, the certificate authority 106 may generate the pointer(s) 120 to be included in the digital certificate 104. In such embodiments, the certificate authority 106, after determining the one or more parameters and pointer(s) 120, then generates the digital certificate 104 and issues the digital certificate 104 to the service 102.

In other embodiments, the service 102 or an entity associated with the service 102 requests that the certificate authority 106 update usage information associated with the digital certificate 104 and stored in the remote certificate information store 124. For example, prior to the validity range of the digital certificate 104 expiring, the service 102 requests that the certificate authority 106 extend the validity range for one month. In response, the certificate authority 106 may update the validity range stored in the remote certificate information store 124. In various embodiments, the certificate authority 106 makes a determination as to whether the usage information associated with the digital certificate 104 should be updated to enable the digital certificate 104 to continue to be used. In one example, if the digital certificate 104 utilizes an encryption algorithm that is outdated or has been compromised, the certificate authority 106 can then determine not to update the usage information (e.g., extend the validity range). The certificate authority 106, client computer system 108, or other entity may perform a check of the digital certificate 104 to determine if the usage information should be updated to extend the use of the digital certificate.

In various embodiments, the certificate authority 106 is responsible for generating and transmitting the update to the remote certificate information store 124. The update may include executable instructions or other information that causes the remote certificate information store 124 to modify one or more fields and/or attributes of the digital certificate 104. In yet other embodiments, the update includes a new digital certificate generated by the certificate authority which contains all the information of the digital certificate but has modified information for the one or more fields and/or attributes modified by the certificate authority 106. For example, the new digital certificate contains the same issued ID and serial number (described in greater detail below in connection with FIG. 4) of the digital certificate 104, but contains updated validity range information. This enables the certificate authority 106 to update existing digital certificates without the need to generate new digital certificates.

The remote certificate information store 124, in various embodiments, is a computer system that is reachable over a network, such as the Internet, by the client computer system 108 and the certificate authority 106 or other entity responsible for updating, creating, or deleting the usage information maintained by the remote certificate information store 124. In addition, the client computer system 108 may execute an application or service that communicates with the remote certificate information store 124 to obtain usage information. In various embodiments, the client computer system 108 terminates the TLS session 110 based at least in part on the usage information obtained from the remote certificate information store 124. Furthermore, the client behavior may be varied if the client computer system 108 does not get a response from the remote certificate information store 124.

In one example, the client computer system 108 determines to trust the digital certificate 104 because the digital certificate 104 indicates that the expiration date was within a certain value (e.g., 10 days ago). In another example, the client computer system 108 waits for a response from the remote certificate information store 124 or queries another remote certificate information store as described in greater detail below. In yet another example, the client computer system 108 makes a determination based at least in part on a set of rules and/or heuristics and the usage information. The client computer system 108, in various embodiments, terminates the TLS session 110 based at least in part on the usage information obtained from the remote certificate information store 124 in response to the request. In various embodiments, the client 108 generates a determination on whether to trust the digital certificate 104 based at least in part on not receiving a response from the remote certificate information store 124. For example, the client 108 waits to receive a response until the expiration of a timeout interval, if no response from the remote certificate information store 124 is received before the expiration of the timeout interval the client generates a determination (e.g., using the set of rules and/or heuristics as described above) based at least in part on the information included in the digital certificate 104. The client 108 (e.g., the browser application or application executed by the client 108) may fail open, fail close, or display a prompt to a user enabling the user to determine whether to trust the digital certificate in response to not receiving usage information from the remote certificate information store 124.

In various embodiments, the service 102 (e.g., computing resources implementing the service 102) obtains the usage information from the remote certificate information store 124 on behalf of the client 108 and attaches or otherwise provides the information to the client 108 along with the digital certificate 104. In such embodiments, the service 102 may perform the same operations as the client 108 to obtain the pointer 120 from the digital certificate 104 and query the remote certificate information store 124 for the usage information. The usage information may then be attached to the digital certificate 104, for example, as additional metadata associated with the digital certificate 104. In some embodiments, the service 102 or component thereof, such as a server computer system implementing the service, digitally signs the usage information attached to the digital certificate 104 to certify that the service 102 obtained the usage information from the remote certificate information store 124 on behalf of the client 108.

In yet other embodiments, the service 102 obtains the usage information from the remote certificate information store 124 on behalf of the client 108 and then causes the certificate authority 106 to electronically sign the usage information to verify the usage information. In various embodiments, the process of attaching the usage information to the digital certificate on behalf of the client 108, as described above, includes attaching the usage information to the digital certificate 104 using the same process to append additional information to a digital certificate as used in TLS Certificate Status Request extension or Online Certificate Status Protocol (OCSP) stapling. This process allows the service 102 to reduce the resource cost on the client 108 by providing responses from the remote certificate information store 124 (e.g., the usage information) and appending or "stapling" the responses (e.g., usage information) to the initial TLS handshake. As described above, this information may be signed by the certificate authority 106 and/or the service 102 and, in some embodiments, includes a timestamp of other information indicating when the information was retrieved from the remote certificate information store 124. The TLS Certificate Status Request extension is specified in RFC 6066 and 6961 which is hereby incorporated by reference as if it were set forth in its entirety herein.

Figure 2:
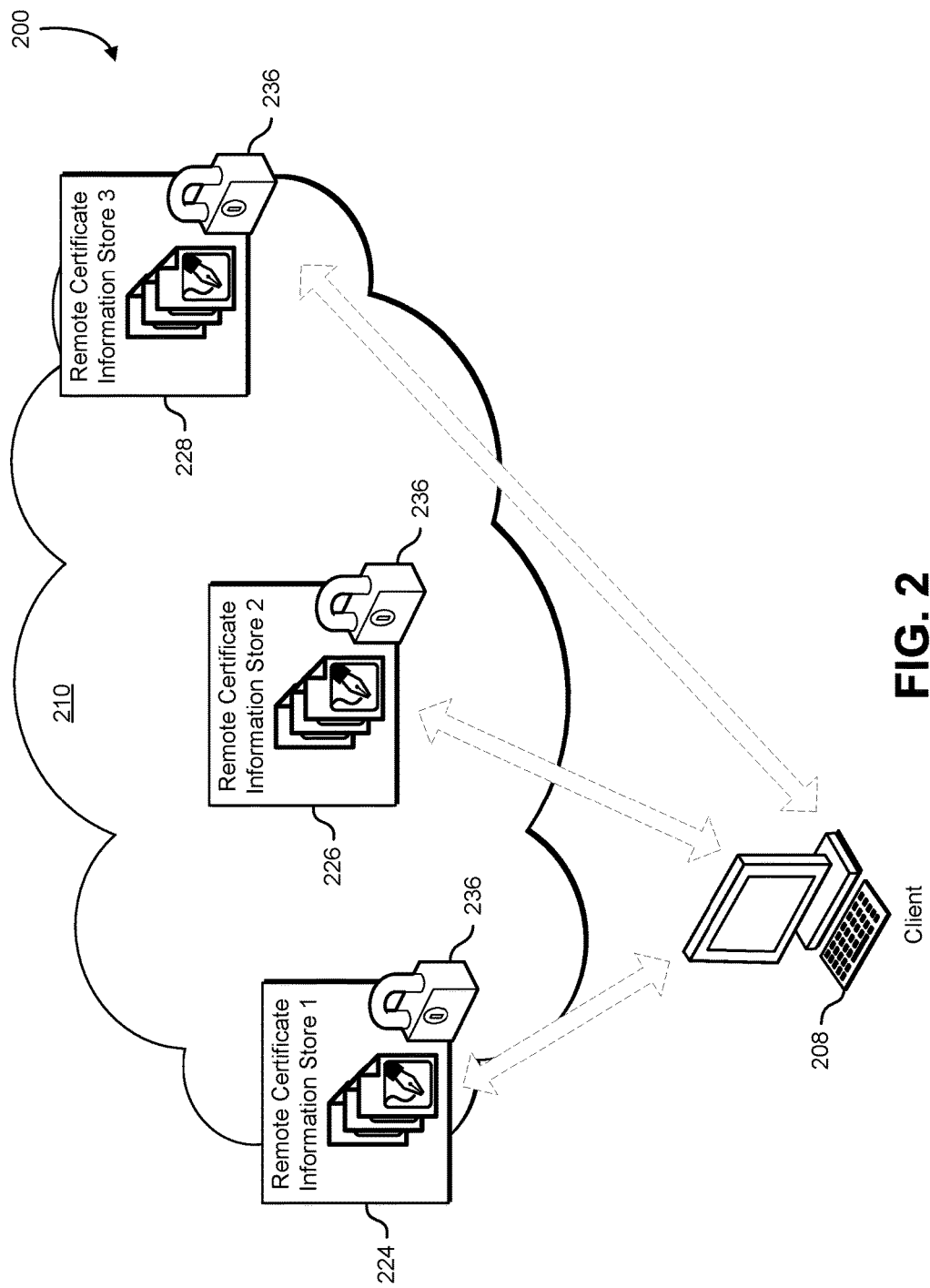
FIG. 2 illustrates an example environment in which a digital certificate includes a pointer to a remote certificate information store containing information associated with the usage of the digital certificate in accordance with an embodiment.

FIG. 2 shows an illustrative example of an environment in which various embodiments may be practiced. An environment 200 includes a client 208 communicating over a network 210 with one or more remote certificate information stores. The network 210 may include any public or private network between two or more computer systems. The environment 200, as illustrated in FIG. 2, includes a 'remote certificate information store 1' 224, 'remote certificate information store 2' 226, and 'remote certificate information store 3' 228. Each of the remote certificate information stores illustrated in FIG. 2 may be accessible via a server computer system or other computing resources that maintain usage information associated with one or more digital certificates as described above in connection with the remote certificate information store 124 illustrated in FIG. 1.

In addition, the usage information maintained in the remote certificate information stores may be authenticated based at least in part on an electronic signature 236 generated by a certificate authority (not shown in FIG. 2 for simplicity). As described in greater detail below the electronic signatures 236 may be generated based at least in part on a private cryptographic key of a particular certificate authority. Furthermore, each remote certificate information store may contain a plurality of electronic signatures 236. For example, each digital certificate for which the remote certificate information store maintains usage information has an electronic signature 236 associated with it. In addition, the plurality of electronic signatures 236 may be generated by a plurality of distinct certificate authorities. For example, a particular remote certificate information store maintains usage information for a plurality of digital certificates issued by a plurality of certificate authorities.

As described above, the usage information may be maintained by the remote certificate information stores in accordance with the X.509 schema. In various embodiments, the remote certificate information stores execute a consensus protocol to ensure that updates to the usage information associated with a particular digital certificate is propagated to each remote certificate information store that maintains usage information associated with the particular digital certificate. The consensus protocols may include distributed lockstep protocols, blockchain protocols, Paxos protocols, a hashgraph, or other protocol suitable for establishing consensus in a distributed network. The client 208 may be able to communicate with each remote certificate information store illustrated in FIG. 2 with dashed arrows. In various embodiments, the pointer in the digital certificate directs the client 208 to a particular remote certificate information store. In yet other embodiments, the pointer includes a multicast address or other mechanism to direct queries to the appropriate remote certificate information store based at least in part on various attributes such as the location of the client 208, a digital certificate, usage information, remote certificate information stores, certificate authorities, or other information accessible to the client 208. In various embodiments, the client 208 generates, based at least in part on the usage information, a determination whether to trust the digital certificate. In one example, the usage information indicates a validity range associated with the digital certificate, the client 208 then determines if the digital certificate is within the validity range and generates a determination whether to trust the digital certificate.

Figure 3:
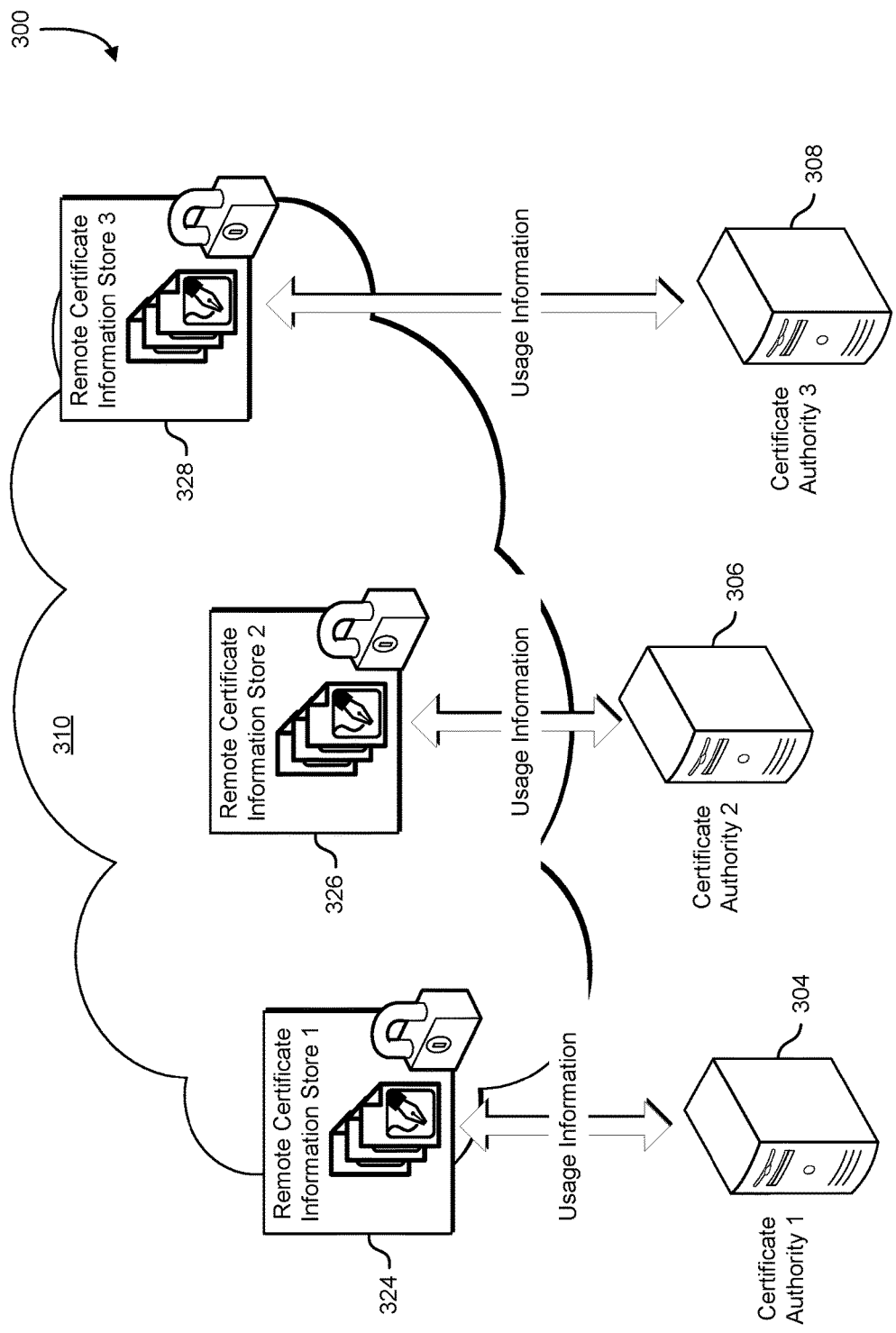
FIG. 3 illustrates an example environment in which a certificate authority provides updated usage information to a remote certificate information store containing information associated with a digital certificate in accordance with an embodiment.

FIG. 3 shows an illustrative example of an environment in which various embodiments may be practiced. An environment 300 includes various certificate authorities communicating over a network 310 with one or more remote certificate information stores. The network 310 may include any public or private network between two or more computer systems as described in the present disclosure. The environment 300, as illustrated in FIG. 3, includes a 'remote certificate information store 1' 324, 'remote certificate information store 2' 326, and 'remote certificate information store 3' 328. Each of the remote certificate information stores illustrated in FIG. 3 may be a server computer system or other computing resources that maintain usage information associated with one or more digital certificates as described above in connection with the remote certificate information store 124 illustrated in FIG. 1.

In addition, the environment 300, as illustrated in FIG. 3, includes a 'certificate authority 1' 304, a 'certificate authority 2' 306, and 'certificate authority 3' 308. Each of the certificate authorities illustrated in FIG. 3 may include an entity responsible for generating and issuing digital certificates as described above in connection with the certificate authority 106 illustrated in FIG. 1. In various embodiments, the certificate authorities provide usage information to the remote certificate information stores. The usage information may include various constraints, restrictions, and/or requirements on the use of digital certificates as described above. For example, the usage information may include a validity range for a particular digital certificate. Furthermore, as described above, the remote certificate information stores may maintain a database of usage information keyed based at least in part on identification information of digital certificates, such as issuer identification information (e.g., the certificate authorities) and/or serial numbers as described in greater detail below in connection with FIG. 4.

As described above in connection with FIG. 1, the usage information may require updates. For example, the validity range of a particular digital certificate will expire within an interval of time and an issuing certificate authority may be responsible for updating the validity range with or without a request from an owner or customer associated with the particular digital certificate. Furthermore, prior to updating the validity range (or other usage information) the issuing certificate authority may perform one or more checks to determine if the digital certificate is still valid or should remain valid before updating the usage information. As illustrated in FIG. 3, each certificate authority may maintain its own remote certificate information store. In yet other embodiments, the remote certificate information stores are maintained by entities other than the certificate authorities and a particular certificate authority updates usage information for digital certificates issued by the particular certificate authority.

Figure 4:
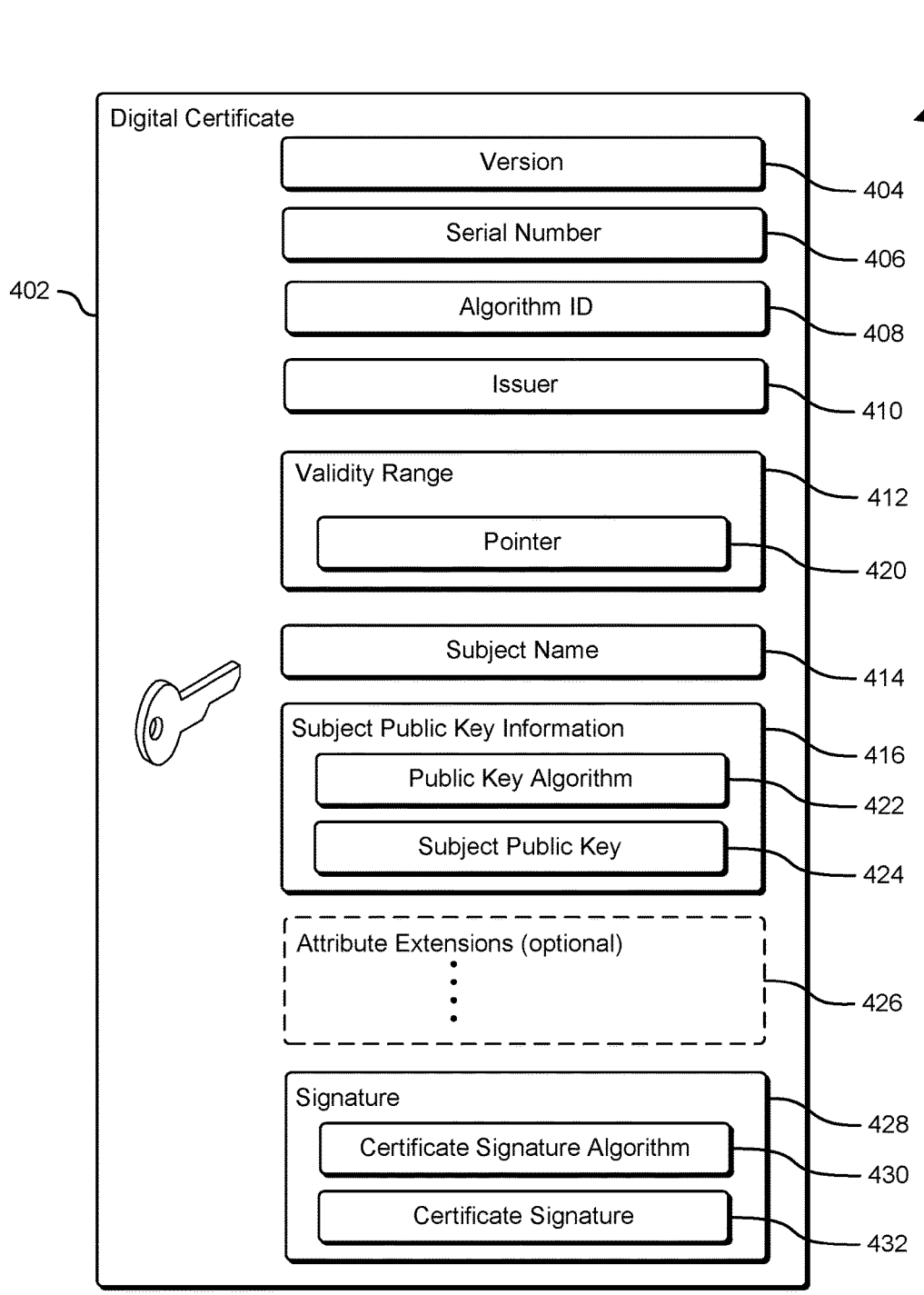
FIG. 4 illustrates an example environment in which a digital certificate includes a pointer to a remote certificate information store containing information associated with the usage of the digital certificate in accordance with an embodiment.

FIG. 4 shows a diagram 400 illustrating example of a digital certificate 402 that includes attributes and optional attribute extensions that may be used as a pointer 420 to a remote certificate information store maintaining usage information associated with the digital certificate 402, in accordance with an embodiment. The diagram 400 illustrates the structure of a digital certificate 402, such as an X.509 digital certificate. X.509 certificates are used for the purpose of illustration, other types of digital certificates or other documents that comprise and/or specify a public key may be used in accordance with the present disclosure. The term digital certificate includes information, data, and other embedded objects within a digital certificate placed in certain locations and in a certain order as defined by the schema and/or standardization of a set of digital certificates.

The structure of an X.509 digital certificate is described in RFC 5280 which is hereby incorporated by reference as if it were set forth in its entirety herein. The digital certificate 402 includes a version field 404, a serial number field 406, an algorithm ID field 408, an issuer field 410, a validity range 412, a pointer 420, a subject name 414, and subject public key information 416. The version field 404 describes the version of the structure of the digital certificate 402. For example, for an X.509 certificate the version field 404 can specify a version of the extensions that are used with the digital certificate 402. The serial number field 406 holds an identifier assigned by and issuing certificate authority that is unique to each issued certificate.

The algorithm ID field 408 contains an algorithm identifier that specifies an algorithm that is used by the certificate authority to sign the digital certificate 402. Various signature algorithms are specified in RFC 3279, RFC 4055, and RFC 4491, which are herein incorporated by reference as if the references were set forth in their entirety herein, but other signature algorithms may also be specified. The issuer field 410 includes issuer identification information that identifies the entity that has signed and issued the digital certificate 402. The validity range 412 specifies a range of time for which the digital certificate 402 is valid. As described above, the validity range 412 may include a pointer 420 which directs a client application or other computing resources to a remote certificate information store that contains information indicating the validity range 412. In yet other embodiments, the pointer 420 is included in a separate and/or distinct field of the digital certificate 402. In one example, the pointer 420 is included in an attribute extensions field 426 as described in greater detail below. In another example, the pointer 420 is included in a certificate policy field not illustrated in FIG. 4 for simplicity. In yet another example, an additional field is added to the X.509 certificate to contain the pointer 420. In general, any location within the digital certificate 402 to maintain the pointer 420 is considered within the scope of the present disclosure.

Returning to the example above, the validity range 412 specifies a start date and an end date for the validity period of the digital certificate 402. In various embodiments, this information is maintained in the remote certificate information store as described above. Furthermore, the usage information maintained by the remote certificate information store may be maintained in the X.509 schema as illustrated in FIG. 4. Therefore, the digital certificate 402 illustrated in FIG. 4, may be stored in a remote certificate information store. In such scenarios, the remote certificate information store may respond to queries requesting information associated with the digital certificate 402 by obtaining the queried information from the digital certificate 402. The subject name 414 identifies the entity associated with the public key identified in the subject public key information 416. The subject public key information 416 specifies a public key algorithm 422 and a subject public key 424. The public key algorithm 422 identifies the particular algorithm used to generate the subject public key 424. The public key algorithm 422 may be an algorithm specified in RFC 3279, RFC 4055, RFC 4491, or other cryptographic signature algorithms.

In various examples, the digital certificate 402 can include one or more optional extensions. A list of optional attribute extensions 426 can include one or more extensions that define attributes usable by a client to determine a remote certificate information store maintaining usage information associated with the digital certificate 402. In addition, the optional attribute extensions 426 may include information constraining or otherwise restricting the use of the digital certificate. For example, the optional attribute extensions 426 may include a number of times the digital certificate 402 may be used. In another example, the optional attribute extensions 426 may include a particular use case the digital certificate 402 can be used for. The digital certificate 402 includes a signature 428. The signature 428 includes a certificate signature algorithm 430 and a certificate signature 432. The certificate signature algorithm 430 is an identifier that identifies an algorithm used to generate the certificate signature 432. The algorithm may be an algorithm specified in RFC 3279, RFC 4055, RFC 4491, or other cryptographic signature algorithms. The certificate signature 432 is generated by the entity identified by the subject name 414, using a private key associated with the subject public key information 416.

The remote certificate information store may maintain information associated with any of the attributes shown for the digital certificate 402, as well as other X.509 certificate attributes. In addition, digital certificates may be extended to include additional attributes, and the additional attributes may be maintained by the remote certificate information store for use by client devices when evaluating the validity of the digital certificate 402.

Figure 5:
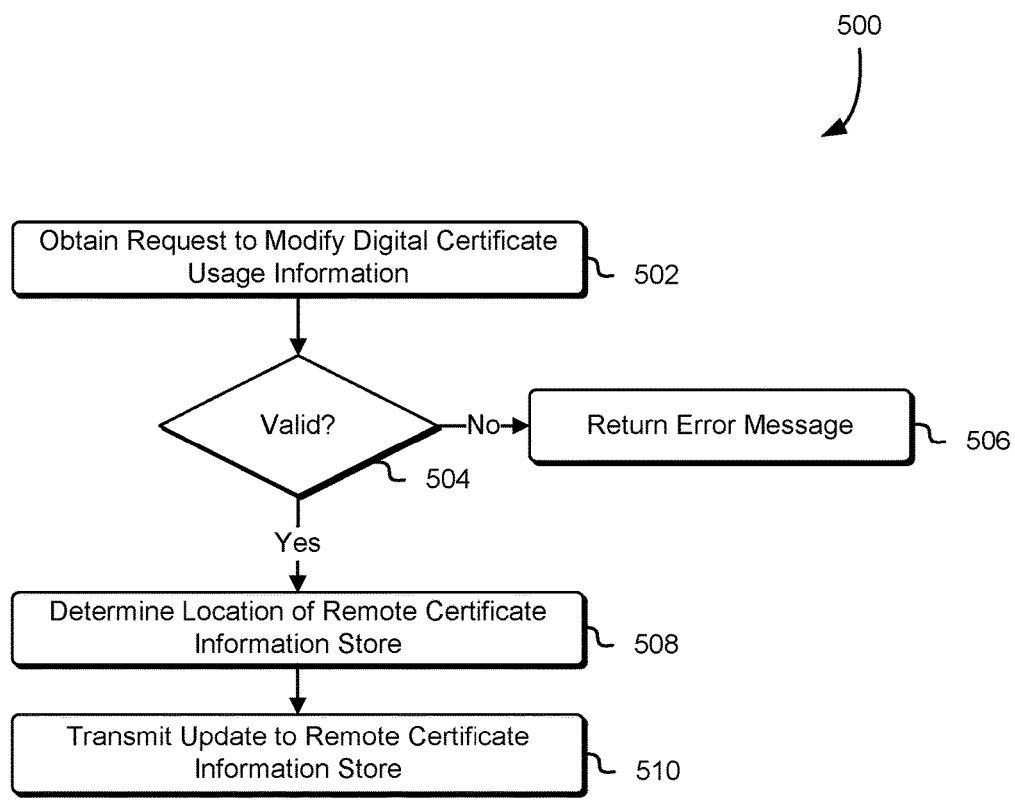
FIG. 5 is a block diagram illustrating a process for using a network service to identify an entity intercepting a connection between a client and a destination server in accordance with an embodiment.

FIG. 5 is a block diagram illustrating an example of a process 500 for updating usage information maintained by a remote certificate information store associated with a digital certificate in accordance with at least one embodiment. Some or all of the process 500 (or any other processes described, or variations, and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 500 may be performed by any suitable system, such as a server in a data center, by various components of the environment 100 described in conjunction with FIG. 1, such as a certificate authority, by multiple computing devices in a distributed system of a computing resource service provider or by a service provided by a computing resource service provider. The process 500 includes a series of operations which result in updating a remote certificate information store. For example, the process 500 includes obtaining a request to modify usage information associated with a digital certificate 502. The request may be generated by an owner of the digital certificate or entity associated with the digital certificate. In yet other embodiments, the request may be generated by a computer system responsible for monitoring the digital certificate. For example, the remote certificate information store monitors the usage information maintained by the remote certificate information store to determine whether the usage information requires an update (e.g., the validity range for a particular digital certificate is set to expire within an interval of time).

In step 504, the system performing the process 500 determines in the request to modify the usage information is valid. As described above, the certificate authority may perform one or more checks to determine whether to update the usage information. In one example, the certificate authority may determine that a certificate signature algorithm associated with the digital certificate has been deprecated and therefore the usage information associated with the digital certificate should not be updated. If the request is determined to be invalid, the system performing the process 500 returns an error message 506. The error message, in various embodiments, is provided to the owner of the digital certificate information that the usage information will not be updated and that the digital certificate may no longer be valid or may only be valid for a certain amount of time.

In step 508, if the system performing the process 500 determines the request is valid, the system performing the process 500 then determines the location of the remote certificate information store. In various embodiments, the certificate authority maintains a single remote certificate information store. In yet other embodiments, the certificate authority utilizes a pointer included in the digital certificate to determine the location of the remote certificate information store as described above. In step 510, the system performing the process 500 transmits an update to the remote certificate information store. The update, in various embodiments, includes a new X.509 digital certificate with updated usage information to be maintained by the remote certificate information store. In yet other embodiments, the update includes a request that, when processed by the remote certificate information store, causes the remote certificate information store to modify usage information associated with a digital certificate indicated in the request. For example, the request is an update or a put operation for a database maintained by the remote certificate information store. Note that one or more of the operations performed in 502-510 may be performed in various orders and combinations, including in parallel. In numerous variations to the process 500, one or more of the operations 502-510 may be omitted or performed by other systems of services.

Figure 6:
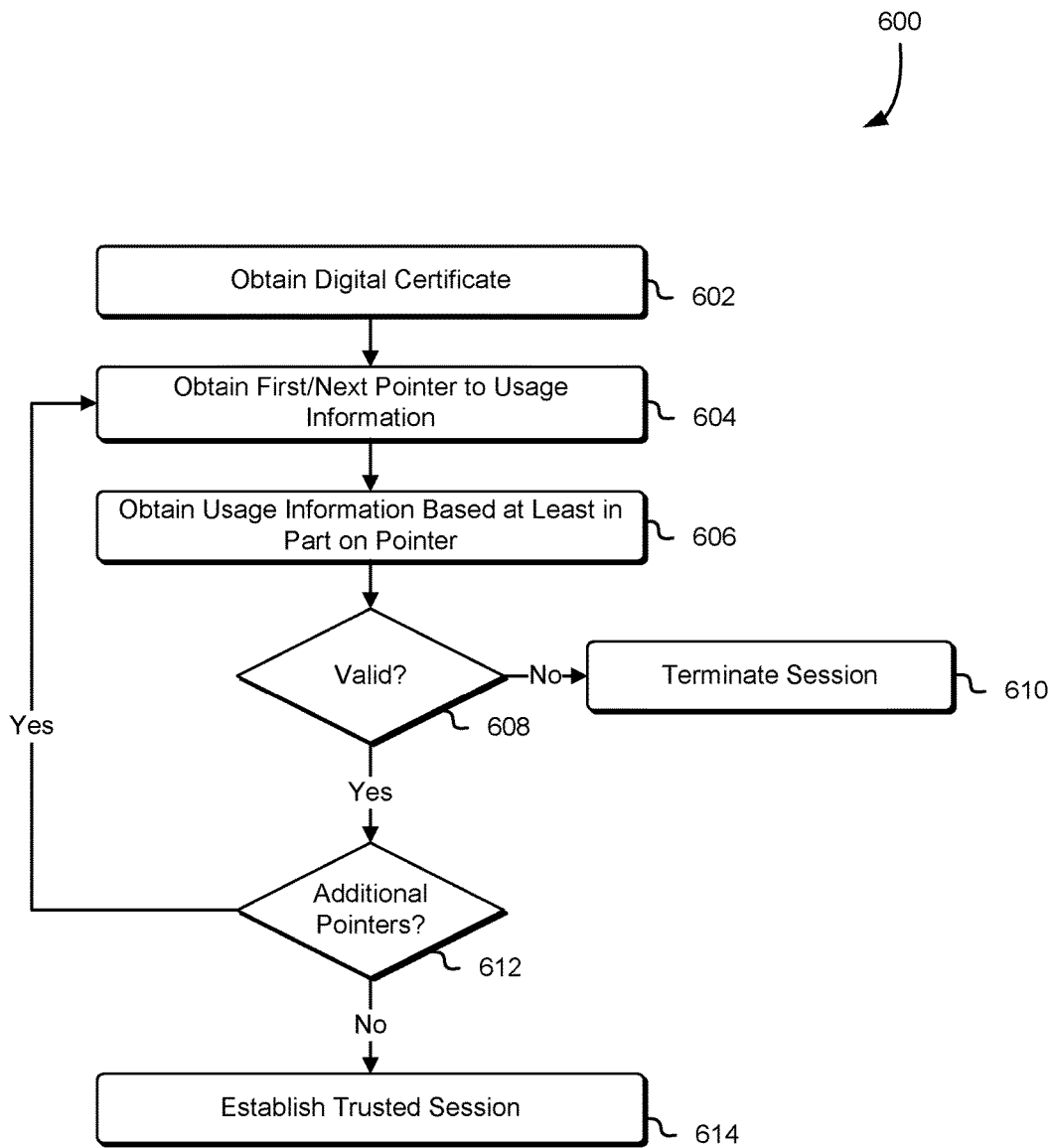
FIG. 6 is a block diagram illustrating a process for identifying an entity intercepting a connection between a client and a destination server in accordance with an embodiment.

FIG. 6 is a block diagram illustrating an example of a process 600 for determining the validity of a digital certificate based at least in part on usage information maintained by a remote certificate information store in accordance with at least one embodiment. Some or all of the process 600 (or any other processes described, or variations, and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 100 described in conjunction with FIG. 1, such as a client, by multiple computing devices in a distributed system of a computing resource service provider or by a service provided by a computing resource service provider. The process 600 includes a series of operations which results in obtaining usage information from a remote certificate information store based at least in part on information included in a pointer. For example, the process 600 includes obtaining a digital certificate 602. As described above, a computer system of a service may provide a digital signature to establish the identity of the service when establishing a secure communications session with a client. Upon receipt of the digital certificate the client may determine if the digital certificate is valid before continuing with the secure communications session.

In step 604, the client obtains the first pointer to usage information included in the digital certificate. As described above, the digital certificate includes one or more pointers, the pointers may include information (e.g., URL or URI) directing the client to a remote certificate information store that maintains usage information associated with the digital certificate. Furthermore, as illustrated by the process 600 and described above, the digital certificate may include a plurality of pointers which may direct the client device to one or more remote certificate information stores. In various embodiments, the client includes an application (e.g., a web browser) that includes executable instructions that, when executed, cause the client to detect the pointer in the digital certificate and generate a query to be transmitted over a network to the remote certificate information store to obtain the usage information to determine the validity of the digital certificate. In addition, as described above, the pointer may be included in a particular field (e.g., validity range) associated with the information indicated by the pointer or may be included in an extension field of the digital certificate and may be associated with all of the usage information of the digital certificate.

In step 606, the client obtains usage information from the remote certificate information store indicated by the pointer. The usage information may include any of the usage information described above such as validity range. In addition, the usage information may be obtained in response to a query transmitted to a network address indicated in the pointer. Once the usage information has been obtained, in step 608, the client determines if the digital certificate is valid based at least in part on the usage information. For example, if the usage information includes a validity range, the client determines if the validity range has expired. If the client determines the digital certificate is invalid based at least in part on the usage information, in step 610 the client terminates the session. However, if the client determines the digital certificate is valid based at least in part on the usage information, in step 612 the client determines if there are additional pointers to additional usage information included in the digital certificate.

If there are additional pointers in the digital certificate, in an embodiment, the client returns to step 604 and continues to evaluate the digital certificate based at least in part on usage information obtained from remote certificate information store(s) indicated by the additional pointers. If there are no additional pointers, the client determines that the digital certificate is valid and, in step 614, establishes a trusted session. For example as described above, this includes establishing a TLS session with a computer system of a service. In numerous various to the process 600, the client performs an interaction with the service based at least in part on the determination. This may include establishing a trusted session, terminating the session, reporting information to the certificate authority and/or the service, or other interaction associated with the determination of whether the certificate is valid. For example, as described above, if the remote certificate information store is unreachable the client may none the less determine to trust the digital certificate based at least in part on the information included in the digital certificate and/or addition information such as a CRL. In addition, the client may generate a determination whether to trust the digital certificate based at least in part on context such as time or location. Note that one or more of the operations performed in 602-614 may be performed in various orders and combinations, including in parallel. For example, the system performing the process 600 may perform operations associated with a plurality of pointers included in the digital certificate parallel with each other. In numerous variations to the process 600, one or more of the operations 602-614 may be omitted or performed by other systems of services.

Figure 7:
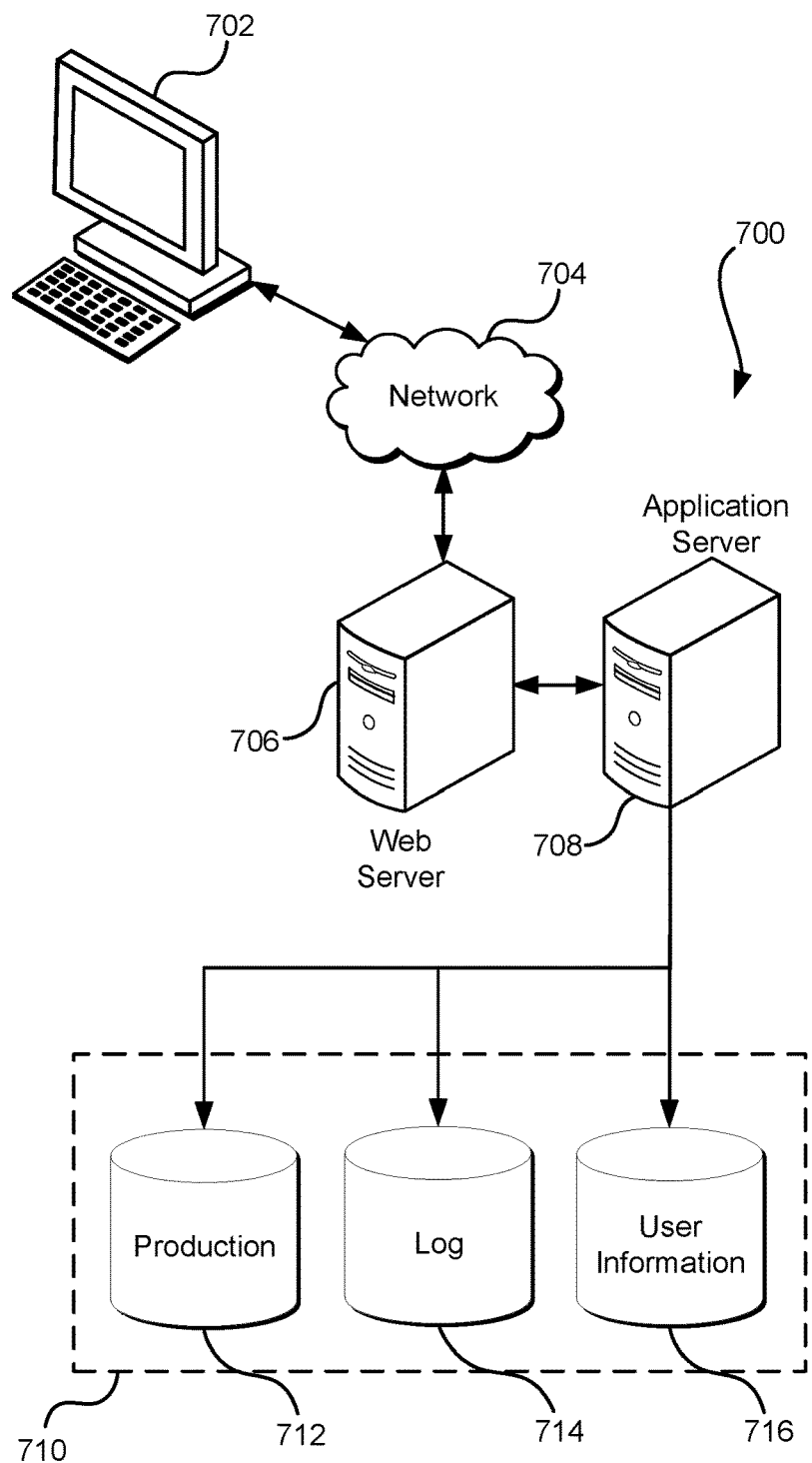
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes, and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting a pointer to a remote certificate information store of a digital certificate,
    wherein:
        the pointer includes a Uniform Resource Identifier (URI) that specifies a location of the remote certificate information store on a network; and
        the digital certificate includes information indicating a plurality of remote certificate information stores of which the remote certificate information store is a member; and
        the remote certificate information store stores usage information associated with the digital certificate, the usage information indicating a number of times the digital certificate is used to assert an identity;
    obtaining the usage information from the remote certificate information store;
    generating, based at least in part on the usage information, a determination whether to trust the digital certificate; and
    performing an interaction with a network service based at least in part on the determination, wherein the interaction includes:
    establishing a trusted session,
    terminating the trusted session, or
    reporting information to a certification authority.

2. The computer-implemented method of claim 1, wherein the computer-implemented method further comprises transmitting, by a certificate authority, an update to the remote certificate information store, the update, as a result of being processed by the remote certificate information store, causes the remote certificate information store to modify the usage information.

3. The computer-implemented method of claim 1, wherein:
    the certificate authority is responsible for issuing the digital certificate; and
    the remote information store further stores a digital signature of the certificate authority.

4. The computer-implemented method of claim 1, wherein the usage information further indicates a validity range of the digital certificate.

5. The computer-implemented method of claim 1, further comprising obtaining the digital certificate at an application executed by a client computer system.

6. A system, comprising:
    one or more processors; and
    memory that stores computer-executable instructions that, if executed, cause the one or more processors to:
    detect a pointer to a remote certificate information store in a digital certificate, wherein:
        the pointer includes a Uniform Resource Identifier (URI) that specifies a location of the remote certificate information store on a network; and
        the digital certificate includes information indicating a plurality of remote certificate information stores of which the remote certificate information store is a member; and
        the remote certificate information store stores usage information associated with the digital certificate, the usage information indicating a number of times the digital certificate is used to assert an identity;
    obtain the usage information from the remote certificate information store;
    generate, based at least in part on the usage information, a determination whether to trust the digital certificate; and
    perform an interaction with a network service based at least in part on the determination, wherein the interaction includes:
    establishing a trusted session,
    terminating the trusted session, or
    reporting information to a certification authority.

7. The system of claim 6, wherein the usage information further includes additional information indicating a constraint on the number of times the digital certificate is usable to assert the identity.

8. The system of claim 6, wherein obtaining the usage information further comprises determining a location of the remote certificate information store based at least in part on the pointer and an issuer of the digital certificate.

9. The system of claim 6, wherein the usage information includes information indicating a restriction on a set of entities that can use the digital certificate without violating a policy associated with the digital certificate.

10. The system of claim 6, wherein the digital certificate further includes a second pointer to a second remote certificate information store containing additional usage information indicating a second constraint on the digital certificate.

11. The system of claim 6, wherein the determination indicates that the digital certificate has not expired based at least in part on a validity range included in the usage information.

12. A non-transitory computer-readable storage medium storing executable instructions that, as a result of being executed by one or more processors of a computer system, cause the computer system to at least:
 detect a pointer to a remote certificate information store of a digital certificate, wherein:
  the pointer includes a Uniform Resource Identifier (URI) that specifies a location of a remote certificate information store on a network; and
  the digital certificate includes information indicating a plurality of remote certificate information stores of which the remote certificate information store is a member; and
  the remote certificate information store stores usage information associated with the digital certificate, the usage information indicating a number of times the digital certificate is used to assert an identity;
 obtain the usage information from the remote certificate information store;
 generate, based at least in part on the usage information, a determination whether to trust the digital certificate; and
 perform an interaction with a network service based on at least in part on the determination, wherein the interaction includes:
 establishing a trusted session,
 terminating the trusted session, or
 reporting information to a certification authority.

13. The non-transitory computer-readable storage medium of claim 12, wherein the remote certificate information store maintains the usage information in accordance with an X.509 digital certificate schema.

14. The non-transitory computer-readable storage medium of claim 12, wherein the pointer further comprises a network address associated with the remote certificate information store.

15. The non-transitory computer-readable storage medium of claim 12, wherein the executable instructions further include instructions that cause the computer system to determine whether to trust the digital certificate based at least in part on a timeout interval expiring.

16. The non-transitory computer-readable storage medium of claim 15, wherein the instructions further include instructions that cause the computer system to determine the digital certificate is valid based at least in part on information included in the digital certificate.

17. The non-transitory computer-readable storage medium of claim 15, wherein the instructions further include instructions that cause the computer system to determine the digital certificate is valid based at least in part on an interaction with a prompt displayed by an application of the computer system.

18. The non-transitory computer-readable storage medium of claim 12, wherein the executable instructions that cause the computer system to detect the pointer further include instructions that cause the computer system to detect the pointer based at least in part on information included in an extension field included in the digital certificate.

19. The non-transitory computer-readable storage medium of claim 12, wherein the executable instructions further include instructions that cause the computer system to generate a query including issuer identification information and a serial number included in the digital certificate.

20. The non-transitory computer-readable storage medium of claim 12, wherein the executable instructions are executed by the one or more processors to cause the computer system to establish a secure communications session with a second computer system.

* * * * *